April 16, 1957     O. FAUSER, JR     2,788,943
COMPARTMENT HEATING DEVICE
Filed Jan. 18, 1954     2 Sheets-Sheet 1
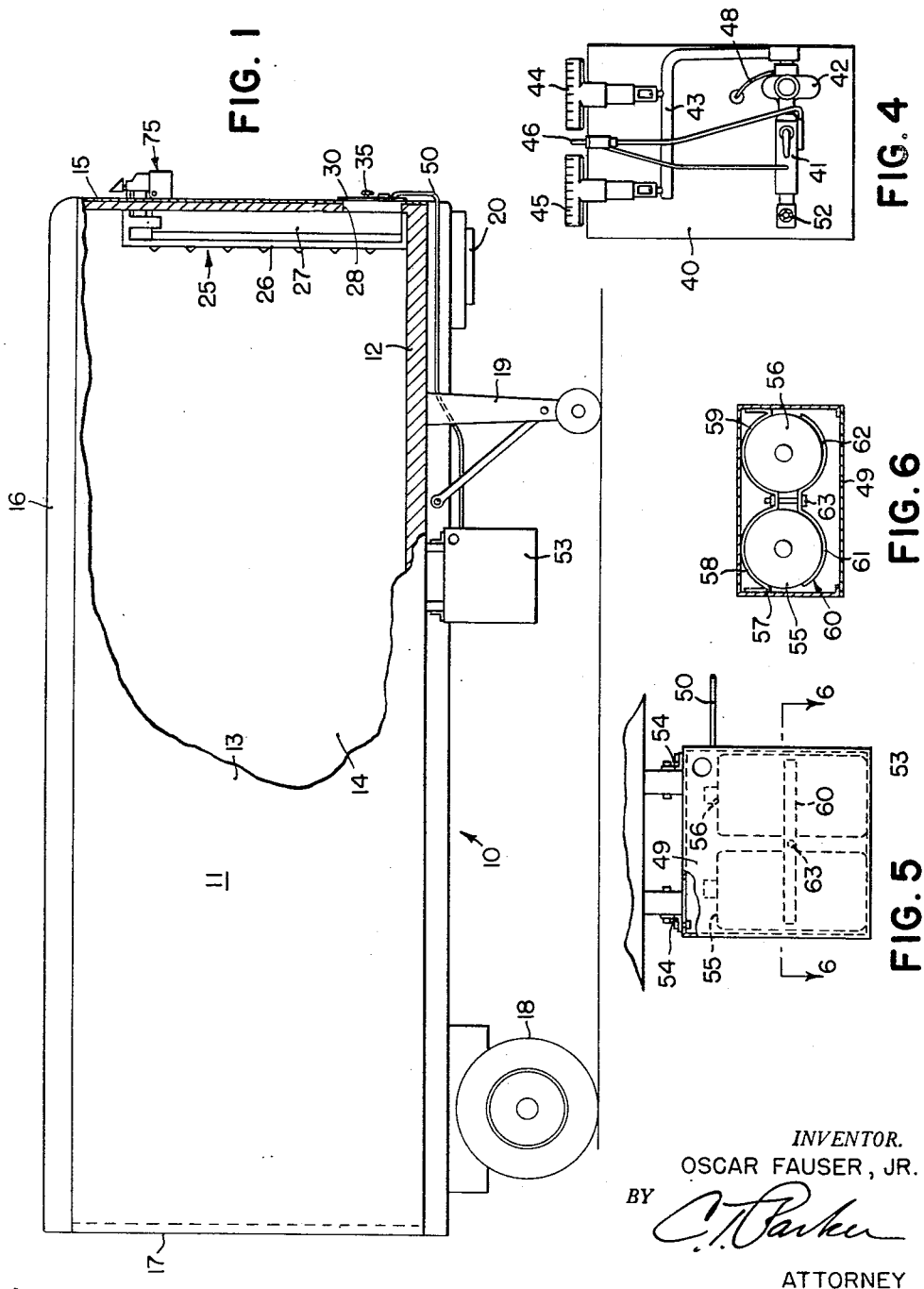
INVENTOR.
OSCAR FAUSER, JR.
BY
ATTORNEY April 16, 1957   O. FAUSER, JR   2,788,943
COMPARTMENT HEATING DEVICE
Filed Jan. 18, 1954   2 Sheets-Sheet 2

INVENTOR.
OSCAR FAUSER, JR.
BY
ATTORNEY

United States Patent Office 2,788,943
Patented Apr. 16, 1957

2,788,943

COMPARTMENT HEATING DEVICE

Oscar Fauser, Jr., Rock Island, Ill., assignor to Oscar Martin Manufacturing Co., Davenport, Iowa, a corporation of Iowa Application January 18, 1954, Serial No. 404,564

2 Claims. (Cl. 237—32)

The present invention relates generally to heating equipment and more particularly to that class of heating equipment used to heat portable cargo compartments, such as highway trucks and trailers, freight cars, and the like, which burn oil or liquid petroleum gas, commonly referred to as LP gas, as fuel for heating the compartments during transit.

At the present time, as far as I am aware, the heating devices available for this purpose are installed inside the highway trailer or other vehicle body and are accessible only through the loading doors, therefore the heater must be lit at the time the compartment is loaded and if the fire goes out during the haul, the inconvenience of opening the doors and re-lighting the burner usually results in the heater remaining out of service for the remainder of the trip. One of the principal objects of this invention, therefore, relates to the provision of a novel and improved heater for a portable compartment, which heater can be serviced, started, or shut off at any time, without opening the loading doors or distributing the load in the compartment. This object is accomplished by providing a small access door in one wall of the compartment and locating the heater inside the compartment adjacent the access door with its controls and burners accessible from the door.

Heretofore, those heaters of this type now on the market have been so installed that the burned gases from the heater are discharged into the compartment for heating the same, which are injurious to some kinds of loads, such as foods. Furthermore, in order to obtain fresh air for combustion, air intake holes must be provided in the wall of the compartment near the burner and exhaust vents in the other end of the compartment to provide for a circulation of heated gases through the compartment. One of the objects of this invention has to do with the provision of a heater which is arranged so that the hot gases of combustion are passed through a heat transfer device and then exhausted to the atmosphere, the air in the compartment being circulated through the heat transfer device where it is heated without being contaminated by the combustion gases. In the accomplishment of this object, fresh air is drawn from outside the compartment for combustion, but none of the cold fresh air can enter the compartment without first passing through the heat transfer device where it is heated before it enters the compartment.

Still another object of this invention relates to the provision of an improved heating installation for portable compartments that is efficient and effective in operation but is compact and requires little room and is inexpensive to install and to maintain.

These and other objects and advantages of my invention will become apparent to those skilled in the art after a consideration of the following description of a preferred embodiment of my invention, reference being had to the drawings appended hereto, in which:

Fig. 1 is a side elevation of a highway semi-trailer in which my invention is installed, a portion of the wall of the trailer compartment being broken away to show the details more clearly.

Fig. 4 is a front elevational view of the control panel, drawn to a larger scale.

Fig. 5 is an enlarged side elevational view of the fuel bottle compartment.

Fig. 6 is a sectional plan view taken along a line 6—6 in Fig. 5.

Figure 3:
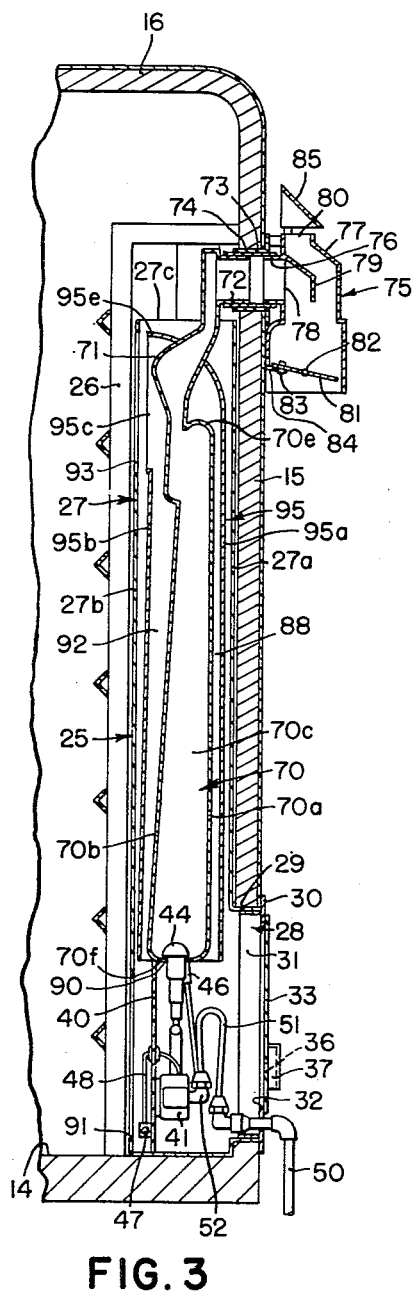
Fig. 3 is a sectional elevational view taken along the line 3—3 in Fig. 2.
Figure 2:
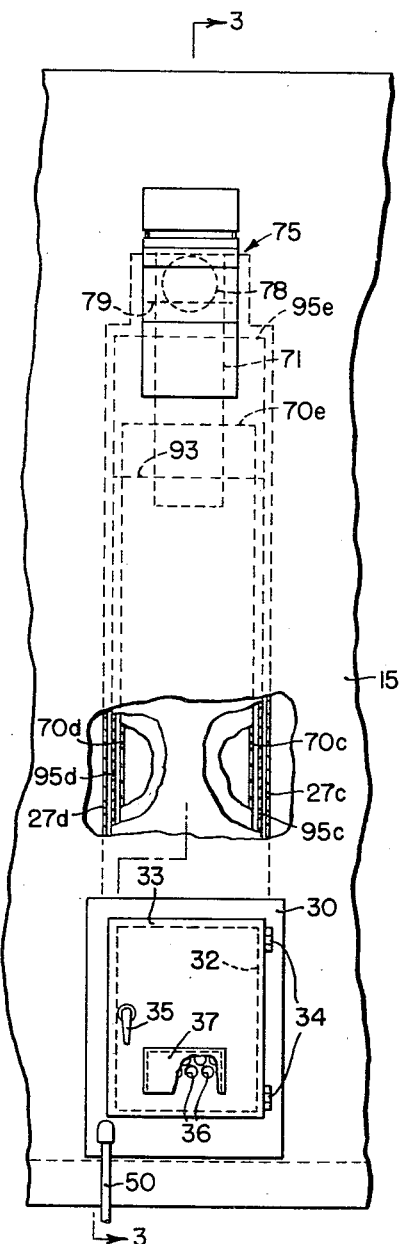
Fig. 2 is a front elevational view of the compartment and heater unit.

Referring now to the drawings, the highway semi-trailer is indicated in its entirety by reference numeral 10 and comprises a body or cargo compartment 11 having a load supporting floor 12, side walls 13, 14, a front wall 15, a roof 16 and a rear loading door 17. The rear end of the body 11 is carried on a wheeled truck 18 and the front end is supported on a retractable wheeled support 19 for purposes of loading the compartment, but during transport the front end is carried by a coupling device or "fifth wheel" on a tractor or power unit, as is well known to those skilled in the art.

In the front end of the compartment is disposed the heater 25 protected by a framework or cage 26 to prevent the cargo from shifting and crushing the heater. The heater includes a vertically extending casing 27 within the cage 26, comprising vertical front and rear walls 27a, 27b, the side walls 27c, 27d, all constructed preferably of sheet metal.

In the front wall 15 of the compartment is an access opening 28, into which extends an outwardly turned flange 29 peripherally extending around a corresponding opening in the casing wall 27a. A door supporting plate 30 is fixed on the outside of the wall 15 and has an inwardly turned flange 31 telescoped within the flange 29 in the casing. The telescoping flanges 29, 31 are adapted to slide in or out relative to each other during installation to accommodate to the various thicknesses of trailer compartment walls. The plate 30 is provided with a rectangular opening 32 covered by an access door 33 mounted on the supporting plate 30 by means of hinges 34. The door 33 is held closed by a suitable latch 35. In the door are a number of holes 36 serving as an air intake for fresh air. The holes are shielded by a shield or hood 37 which encloses the holes 36 on all sides but the bottom through which air can flow, the hood being spaced from the face of the door 33 to permit such air flow during operation.

Inside the casing 27 is a vertically disposed control panel 40 spaced rearwardly of the access opening 28. On this panel is mounted the fuel burning equipment including a manual shut-off valve 41, a thermostat actuated control valve 42, gas manifold 43 and two burners 44, 45 connected to the manifold 43. A pilot light fixture 46 is mounted between the burners, and a thermostat bulb 47 is mounted on the rear of the panel 40 and connected with the valve by a tube 48. Since the details of construction of the fuel-burning equipment are not important in understanding the principles of this invention, and since they are familiar to those skilled in the art, it is not necessary to describe them here in greater detail.

The fuel, preferably LP gas, is brought into the front portion of the lower end of the heater casing by a pipe line 50, which is connected through a gooseneck tube 51 to an elbow fitting 52 at the shut-off valve 41. The supply pipe 50 extends under the floor 12 to a fuel storage case 53 secured to the bottom of the trailer body 11 by bolted flanges 54 and having a front door 49. Inside the case are two bottles 55, 56 nested within a strap metal brace 57 rigidly secured within the case 53 and formed with two semicircular nesting portions 58, 59 embracing the rear sides of the bottles 55, 56, respectively. A complementary strap metal clamp 60 is formed with two semicircular portions 61, 62 embracing the front sides of the bottles 55, 56, respectively, and is secured to the brace 57 by means of a bolt 63 joining the mid-portions of the brace 57 and clamp 60 between the bottle clamping portions. Other pressure control valves and similar apparatus (not shown) may be installed within the case 53, as is well known to those skilled in the art.

Disposed within the heater casing 27 is a combustion chamber 70 constructed of suitable sheet metal and having front and rear walls 70a, 70b, spaced inwardly from the front and rear walls 27a, 27b, of the casing, respectively, and side walls 70c, 70d, fitting more closely within the side walls 27c, 27d, of the casing. The combustion chamber 70 also has a top wall 70e and a bottom wall 70f and the chamber 70 is disposed in the casing so that its bottom wall 70f is in contact with the top edge of the control panel 40.

The top end of the combustion chamber is provided with an exhaust duct 71, substantially narrower than the combustion chamber, which extends upwardly to a forwardly extending cylindrical flange 72 which fits slidably within a cylindrical collar 73 in an opening 74 in the front wall 15 of the compartment. An exhaust vent 75 for preventing back drafts into the combustion chamber is mounted on the front of the front wall 15 and has a cylindrical flange 76 which extends telescopically into the front end of the collar 73.

The vent 75 is of the type disclosed and claimed in my copending application, Serial No. 335,889, filed February 9, 1953, now Patent No. 2,734,501, dated February 14, 1956. Briefly, it comprises a sheet metal housing 77 into which the exhaust gases flow through an opening 78 within the flange 76. A baffle 79 extends down in front of the opening 78. The top of the housing 77 is provided with a discharge opening 80 and the bottom of the housing is provided with a damper 81, which is pivotally mounted on a transverse pivot member 82 and has a counterbalance weight 83 that tends to close the damper against a stop 84. The damper 81 rather loosely closes the bottom of the housing 77 to prevent strong up-drafts through the housing but is balanced to open readily whenever there is a draft downwardly through the housing.

Normally, the exhaust gases of combustion flow through the opening 78 into the housing 77, where they flow under the baffle 79 and up through the top opening 80. An inclined shield 85 deflects the wind, created by the forward speed of the vehicle, upwardly away from the top opening 80, thus preventing down drafts. However, such down drafts do occur at times when the vehicle is standing still and wind is deflected into the top opening 80. The down drafts are deflected away from the exhaust opening 78 by the baffle 79 to prevent them from extinguishing the fire in the heater, and pass down through the balanced damper 81, which swings open to discharge both the down draft of air and the exhaust gases of combustion, without interfering with the movement of the gases out of the combustion chamber. As soon as the down draft condition ceases, the damper 81 closes.

It will be evident that the burners 44, 45 extend upwardly through openings 90 in the bottom wall 70f into the combustion chamber 70. These openings 90 also permit the flow of air for combustion from the air intake 36 through the front portion of the casing. The combustion chamber 70 and panel 40 serve as a dividing wall between the front and rear portions of the heater casing 27. The fresh air from the intake 36 can also flow upwardly through a passage 88 between the front wall 70a of the combustion chamber and the front wall 27a of the casing. During the time the air flows to the top of the combustion chamber 70 it is heated by contact with the chamber wall 70a before it passes out of the top of the casing 27 into the compartment.

The rear wall 27b of the casing is provided with an air opening 91 at the lower portion in back of the panel 40, permitting the air from the compartment to flow into the casing and upwardly through a passage 92 between the rear wall 70b of the combustion chamber and the rear wall 27b of the casing. As it contacts the combustion chamber, the air is heated and flows up to be discharged at the top of the casing 27 with the heated air from the front of the combustion chamber. The upper end of the casing 27 is open and there is an upper opening 93 in the rear wall 27b of the casing, through which the warm air can flow into the compartment 11.

A sheet metal jacket 95 encloses the combustion chamber and comprises a front wall 95a between the front walls 27a, 70a of the casing and combustion chamber, a rear wall 95b between the rear walls 70b, 27b of the chamber and casing, and two side walls 95c, 95d between the side walls of the combustion chamber 70 and casing 27. The purpose of the jacket is to provide a comparatively cool air space immediately inside the casing 27 to prevent overheating of the casing walls. The front wall 95a of the jacket curves rearwardly at its upper end, as indicated at 95e, to direct the warm air from the passage 88 rearwardly in the compartment. This air flows on both sides of the narrow exhaust duct 71, which is imperforate in separated relation to the air passage to maintain the exhaust gases isolated from the heated air.

The operation of the heater is now self-evident to those skilled in the art. The heater can be started by opening the access door 33 and lighting the burners. The air for combustion enters through the intake holes 36 and bottom holes 90 in the combustion chamber and the gases of combustion are discharged through the exhaust compartment. The cold air entering the intake 36 also flows up through the front air passage 88 and is heated, but a smaller quantity of air flows between the jacket and casing to prevent the latter from overheating. The air inside the compartment flows through the opening 91 up through the rear air passage 92 and out through the upper opening 93. Some air flows up through the space between the jacket and casing walls 95b, 27b to prevent the latter from overheating. The temperature of the air flowing through the lower opening 91 and over the thermostat bulb 47 controls the fuel feed valve 42 to maintain a constant air temperature.

I do not intend to limit my invention to the particular details shown and described herein except as set forth in the claims which follow.

I claim:

1. In combination with a vehicle body having a cargo compartment, apparatus for heating said compartment comprising a vertically disposed heater casing mounted within said compartment adjacent a wall thereof, said wall being provided with an access opening adjacent said casing and a door for closing said opening, said casing having an opening in register with said access opening, a vertical control panel mounted in the lower portion of said casing dividing the same into front and rear casing portions, said casing having an air opening in the rear thereof providing for air to flow into said rear casing portion from said cargo compartment, a sheet metal housing serving as a combustion chamber disposed within said casing, extending from the top of said control panel upwardly through said casing and dividing the latter into front and rear vertical air passages, said front air passage communicating with said front casing portion and the rear air passage communicating with said rear casing portion, said access door having an air intake to admit air to said front casing portion and said front air passage, said combustion chamber having a closed upper end near the top of said casing, the latter being provided with an air outlet communicating with said compartment, for discharging the air from both front and rear air passages after it has been heated in contact with the front and rear sides of said combustion chamber, an imperforate exhaust duct connected with said closed upper end of said combustion chamber and extending through the wall of said cargo compartment in separated relation to said air passages for isolating the gases of combustion from said heated air and discharging the same outside said compartment, an exhaust vent mounted on the outer side of said wall in communication with the outer end of said exhaust duct for preventing back drafts into said combustion chamber, and fuel-burning equipment mounted on the front side of said control panel accessible from said access opening and including a burner extending up through the bottom of said combustion chamber.

2. The combination set forth in claim 1, including the further provision of a thermostat bulb mounted on the rear side of said control panel and means operatively connecting said bulb with said fuel burning equipment for controlling the operation of said burner.

References Cited in the file of this patent

UNITED STATES PATENTS

| | | |
|---|---|---|
| Re. 23,223 | Anderson | May 2, 1950 |
| 1,180,691 | Bower | Apr. 25, 1916 |
| 2,163,928 | Andrews | June 27, 1939 |
| 2,229,277 | Clements | Jan. 21, 1941 |
| 2,422,694 | McCollum | June 24, 1947 |
| 2,602,441 | Hollingsworth et al. | July 8, 1952 |
| 2,632,435 | Lundstrum | Mar. 24, 1953 |
| 2,635,939 | Obenchain | Apr. 21, 1953 |

FOREIGN PATENTS

| | | |
|---|---|---|
| 104,393 | Australia | June 28, 1938 |